United States Patent
Choi et al.

(10) Patent No.: US 11,277,248 B2
(45) Date of Patent: Mar. 15, 2022

(54) METHOD FOR TRANSMITTING AND RECEIVING SRS RESOURCE AND COMMUNICATION DEVICE THEREFOR

(71) Applicant: LG Electronics Inc., Seoul (KR)

(72) Inventors: Kukheon Choi, Seoul (KR); Suckchel Yang, Seoul (KR); Jiwon Kang, Seoul (KR); Kyuseok Kim, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/759,774

(22) PCT Filed: Nov. 15, 2018

(86) PCT No.: PCT/KR2018/013988
§ 371 (c)(1),
(2) Date: Apr. 28, 2020

(87) PCT Pub. No.: WO2019/098698
PCT Pub. Date: May 23, 2019

(65) Prior Publication Data
US 2020/0313828 A1 Oct. 1, 2020

Related U.S. Application Data

(60) Provisional application No. 62/587,404, filed on Nov. 16, 2017.

(51) Int. Cl.
*H04W 4/00* (2018.01)
*H04L 5/00* (2006.01)
*H04B 7/06* (2006.01)

(52) U.S. Cl.
CPC ......... *H04L 5/0057* (2013.01); *H04B 7/0602* (2013.01); *H04L 5/0012* (2013.01)

(58) Field of Classification Search
CPC ... H04L 5/0053; H04L 5/0007; H04L 5/0048; H04W 72/0453; H04W 72/042
See application file for complete search history.

(56) References Cited

U.S. PATENT DOCUMENTS

2011/0268028 A1* 11/2011 Stern-Berkowitz ........................
H04L 5/0048
370/328
2012/0014349 A1* 1/2012 Chung ................. H04B 7/0693
370/329

(Continued)

OTHER PUBLICATIONS

3GPP TSG RAN WG1 Meeting 90bis Prague, CZ, Oct. -13, 2017, R1-1717514 (Year: 2017).*

(Continued)

*Primary Examiner* — Atique Ahmed
(74) *Attorney, Agent, or Firm* — Dentons US LLP

(57) ABSTRACT

A method for transmitting an SRS resource by a terminal when all cyclic shifts (CSs) of a sounding reference signal (SRS) resource are not used for SRS comprises the steps of: receiving information on the usage of a CS that is not used for a SRS; receiving information on an SRS resource index, a CS index that is not used for the SRS, and a usage specifying index; and transmitting the SRS resource by using the CS index, wherein the usage of the SRS resource is determined on the basis of information on the usage of the CS and the usage specifying index.

16 Claims, 9 Drawing Sheets

(56) References Cited

U.S. PATENT DOCUMENTS

| | | | | |
|---|---|---|---|---|
| 2012/0052899 A1* | 3/2012 | Wang | ............... | H04W 52/226 |
| | | | | 455/513 |
| 2012/0106489 A1* | 5/2012 | Konishi | ............ | H04W 72/048 |
| | | | | 370/329 |
| 2012/0129561 A1* | 5/2012 | Peng | ................ | H04L 5/0035 |
| | | | | 455/513 |
| 2013/0114564 A1* | 5/2013 | Ogawa | ............. | H04L 5/0023 |
| | | | | 370/330 |
| 2013/0229989 A1* | 9/2013 | Natarajan | ............ | H04L 5/0048 |
| | | | | 370/329 |

OTHER PUBLICATIONS

R1-1717514: ZTE et al., "On short PUCCH for up to 2bits UCi," 3GPP TSG RAN WG1 Meeting #90bis, Prague, Czech, Oct. 9-13, 2017 (8 pages).

R1-1717605: Samsung, "On Beam Management, Measurement and Reporting," 3GPP TSG RAN WG1 Meeting #90bis, Prague, Czech. Oct. 9-13, 2017 (16 Pages).

R1-1717435: ZTE et al., "Discussion on SRS design for NR," 3GPP TSG RAN WG1 Meeting #90bis, Prague, Czech, Oct. 9-13, 2017 (9 Pages).

R1-1718207: NTT Docomo, Inc., "Short-Pucch for UCI of up to 2 bits," 3GPP TSG RAN WG1 Meeting #90bis, Prague, Czech, Oct. 9-13, 2017 (7 Pages).

R1-1718559: Qualcomm Incorporated, "Channelization of 1-symbol short PUCCH with 1 or 2 bits payload," 3GPP TSG, RAN WG1 Meeting #90bis, Prague, Czech, Oct. 9-13, 2017 (19 Pages).

\* cited by examiner

[FIG. 1]
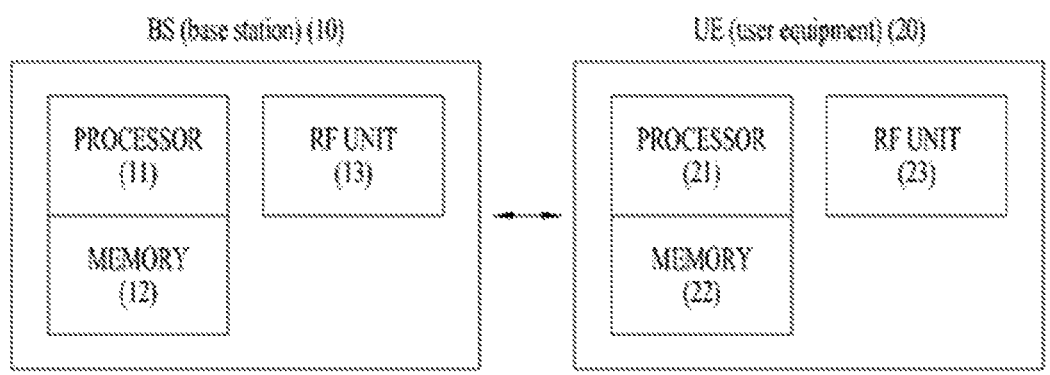

[FIG. 2a]
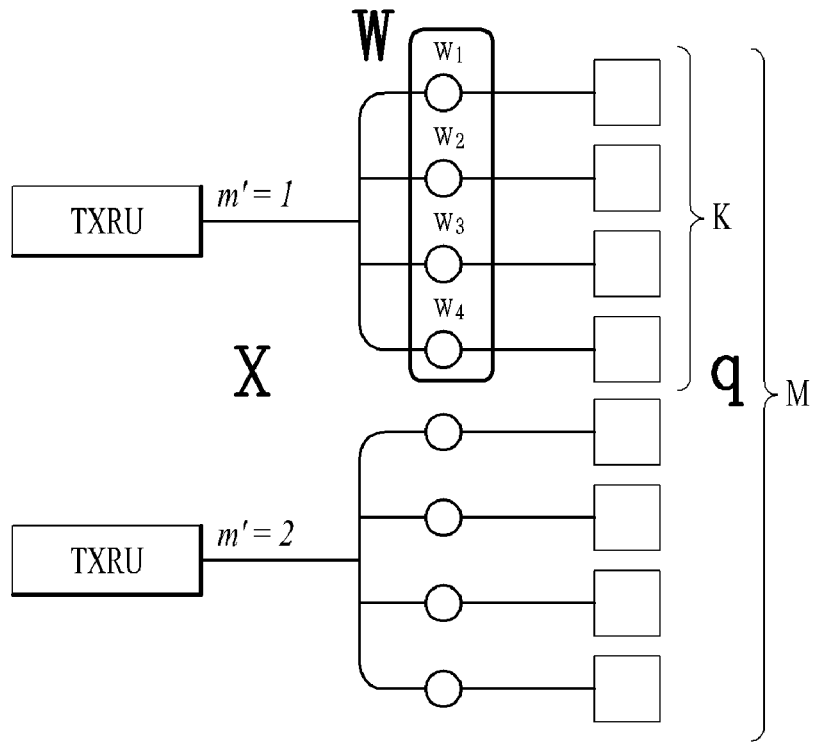
[FIG. 2b]
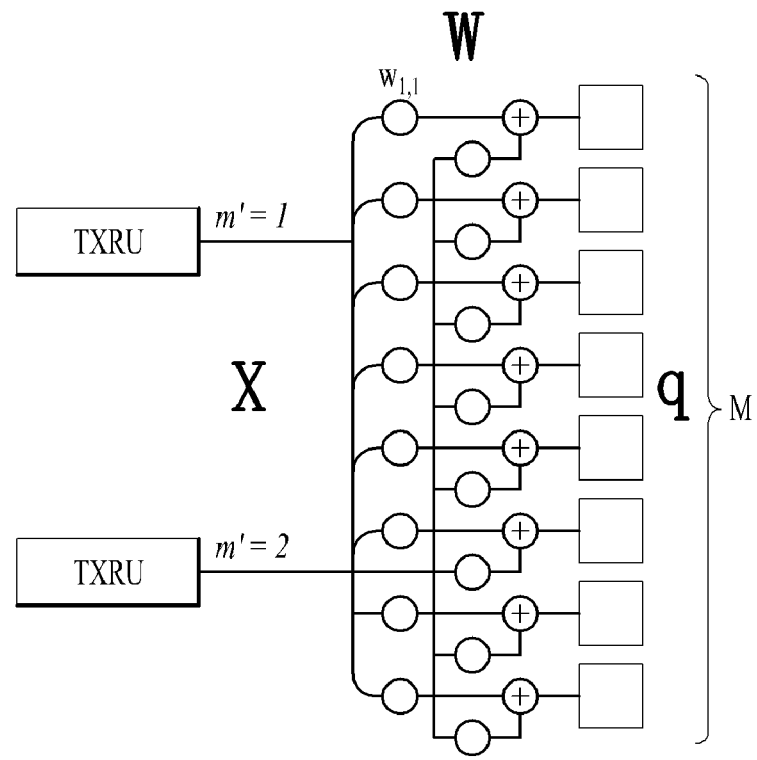

[FIG. 3]
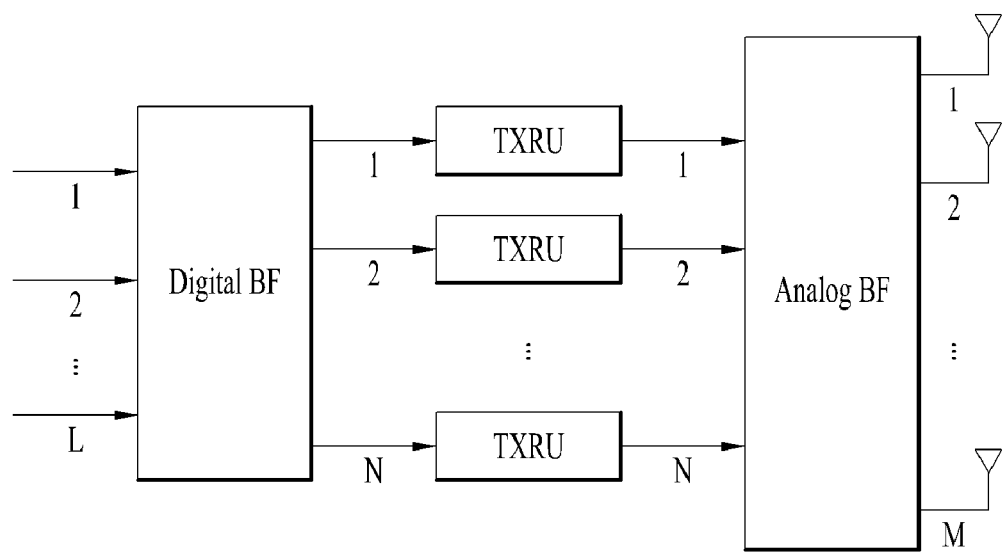

[FIG. 4]
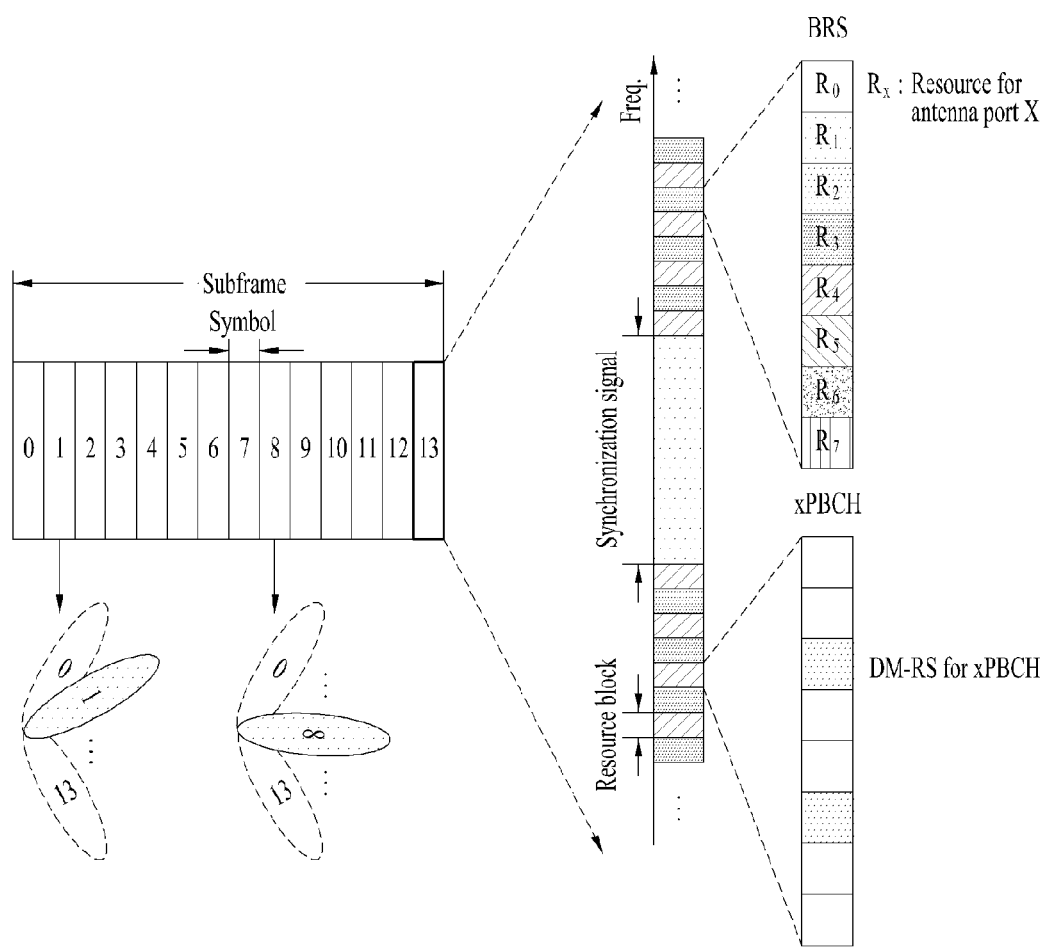

[FIG. 5]
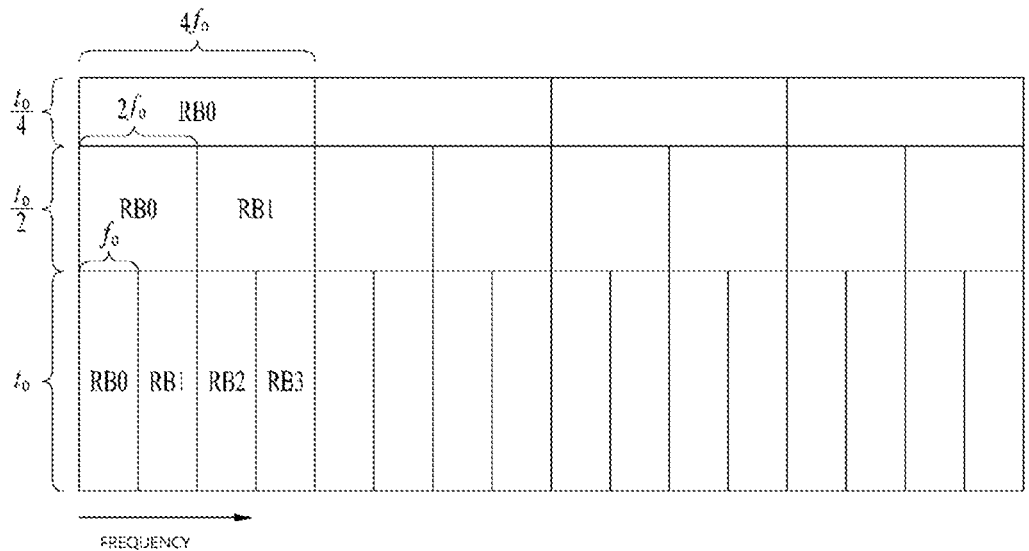
[FIG. 6]
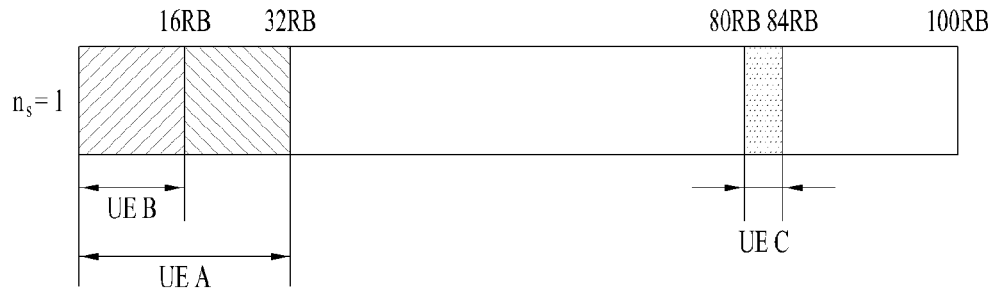
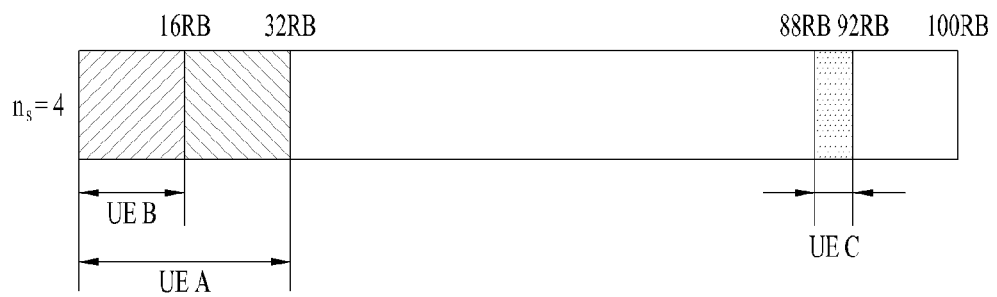

[FIG. 7a]
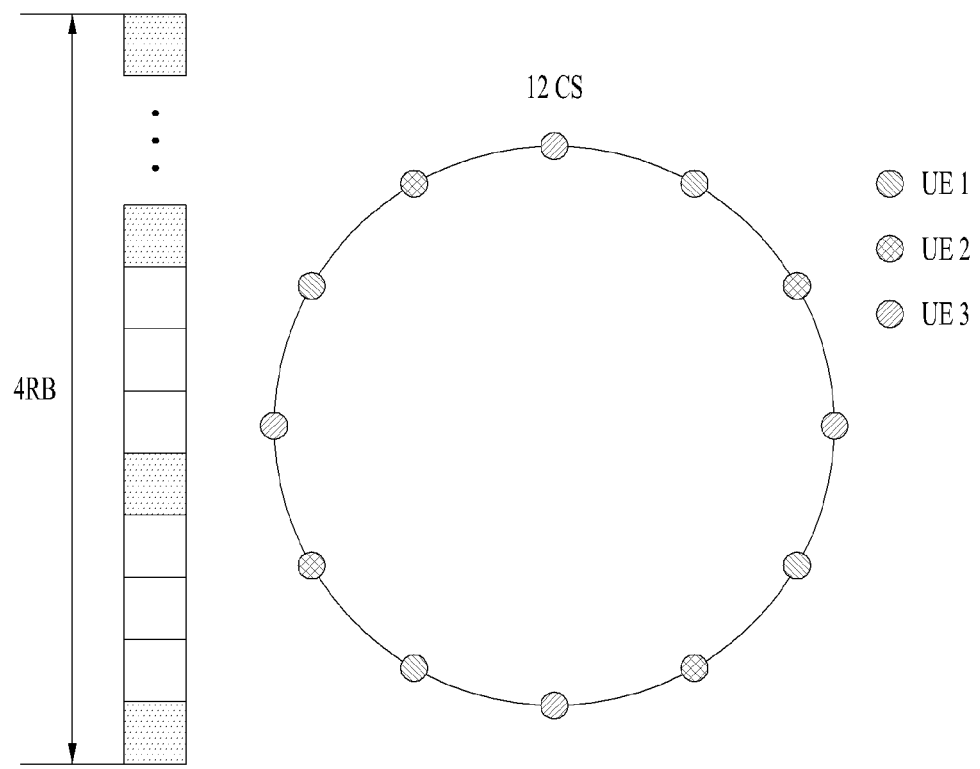

[FIG. 7b]
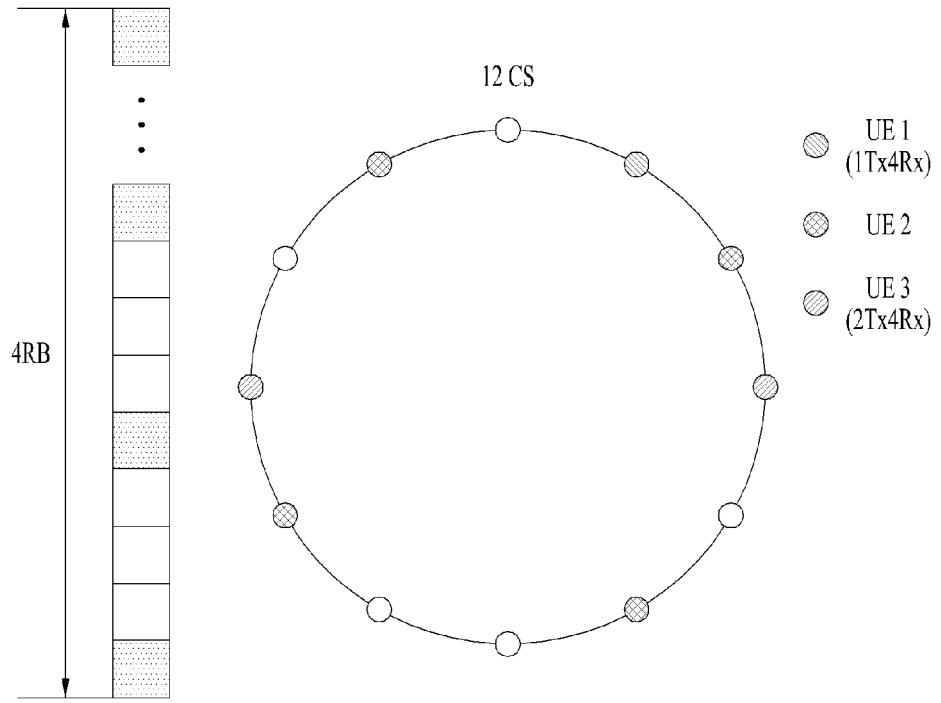
[FIG. 8]
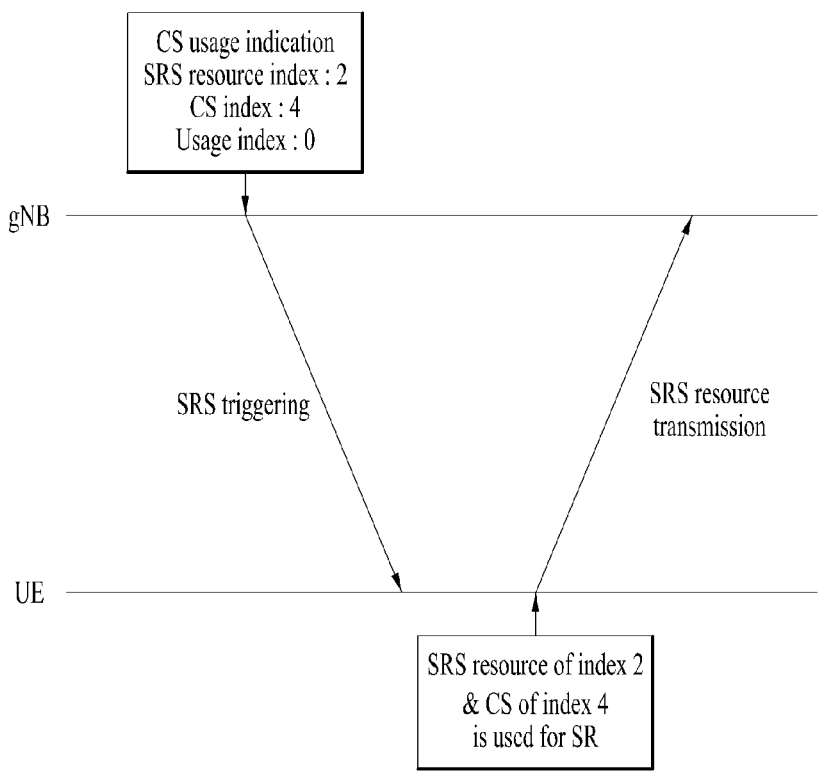

[FIG. 9a]
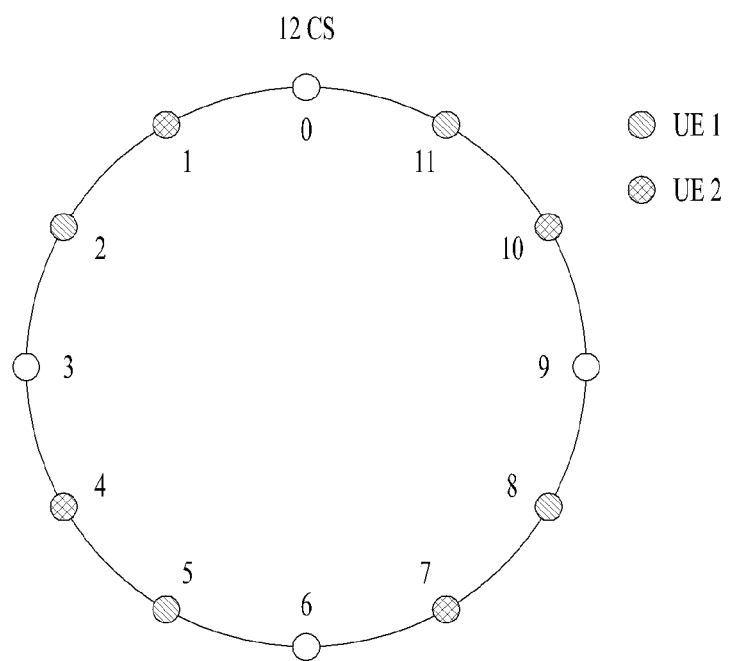
[FIG. 9b]
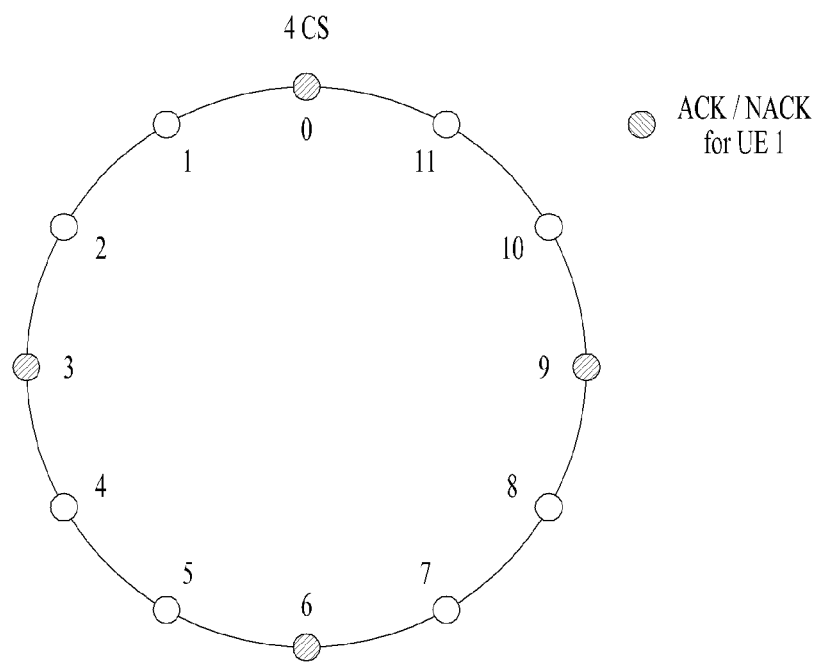

[FIG. 10]
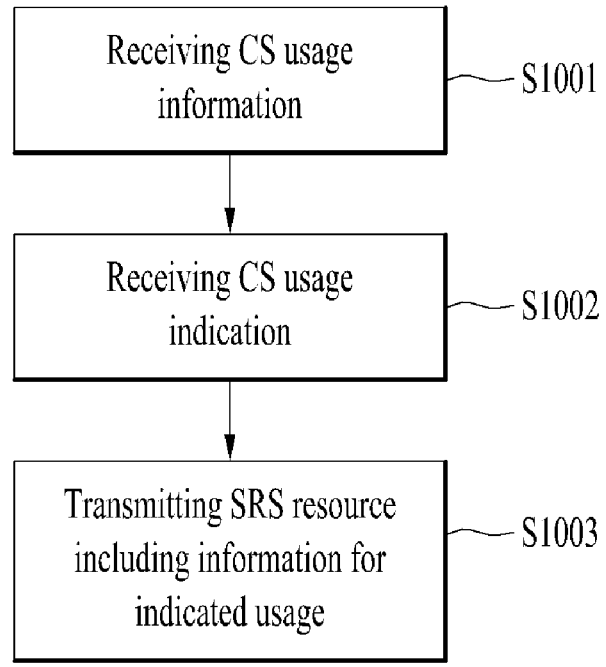
[FIG. 11]
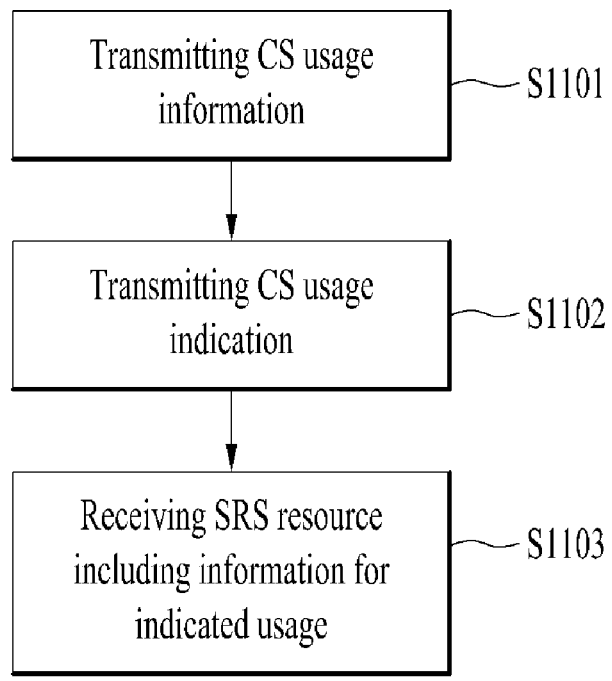

METHOD FOR TRANSMITTING AND RECEIVING SRS RESOURCE AND COMMUNICATION DEVICE THEREFOR

This application is the National Stage filing under 35 U.S.C. 371 of International Application No. PCT/KR2018/013988, filed on Nov. 15, 2018, which claims the benefit of U.S. Provisional Application No. 62/587,404 filed on Nov. 16, 2017, the contents of which are all hereby incorporated by reference herein in their entirety.

TECHNICAL FIELD

The present disclosure relates to a wireless communication system, and more particularly, to methods for transmitting and receiving a sounding reference signal (SRS) resource and communication devices therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present disclosure is to provide a method of transmitting an SRS resource by a user equipment (UE).

Another object of the present disclosure is to provide a method of receiving an SRS resource by a base station (BS).

Another object of the present disclosure is to provide a UE for transmitting an SRS resource.

Another object of the present disclosure is to provide a BS for receiving an SRS resource.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of transmitting a sounding reference signal (SRS) resource by a user equipment (UE) based on all cyclic shifts (CSs) of the SRS resource not used for an SRS, including receiving information about usages of the CSs not used for the SRS; receiving information about an SRS resource index, a CS index not used for the SRS, and a usage indication index; and transmitting the SRS resource using the CS index, wherein usage of the SRS resource is determined based on the information about the usages of the CSs and the usage indication index.

According to another aspect of the present disclosure, provided herein is a method of receiving a sounding reference signal (SRS) resource by a base station (BS) based on all cyclic shifts (CSs) of the SRS resource not used for an SRS, including transmitting information about usages of the CSs not used for the SRS; transmitting information about an SRS resource index, a CS index not used for the SRS, and a usage indication index; and receiving the SRS resource using the CS index, wherein usage of the SRS resource is determined based on the information about the usages of the CSs and the usage indication index.

The UE may be a UE to which antenna switching is applied. The information about the usages of the CSs, the SRS resource index, the CS index, and the usage indication index may be provided from higher layers. The information about the usages of the CSs may include a scheduling request (SR), acknowledgement (ACK), negative ACK (NACK), and a beam failure recovery request and the usage indication index may relate to one of items included in the information about the usages of the CSs. The SRS resource index, the CS index, and the usage indication index may be provided together with the information about the usages of the CSs. The CS index not used for the SRS may include two or more indexes and the usage indication index may be differently configured with respect to the CS index.

Advantageous Effects

According to an embodiment of the present disclosure, uplink control information (UCI) that has small payload or should be ungently transmitted may be transmitted at a reception timing desired by a BS etc.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 1 is a diagram illustrating a wireless communication system for implementing the present disclosure.

FIG. 2a is a diagram illustrating TXRU virtualization model option 1 (sub-array model) and FIG. 2b is a diagram illustrating TXRU virtualization model option 2 (full connection model).

FIG. 3 is a block diagram for hybrid beamforming.

FIG. 4 is a diagram illustrating beams mapped to BRS symbols in hybrid beamforming.

FIG. 5 is a diagram illustrating symbol/sub-symbol alignment between different numerologies.

FIG. 6 is a diagram illustrating an LTE hopping pattern.

FIG. 7a is a diagram illustrating an example of using CSs by UEs for 4-port SRS transmission.

FIG. 7b is a diagram illustrating an example of using CSs by UEs including UEs for antenna port switching.

FIG. 8 is a diagram illustrating SRS triggering and reserved CS usage indication for an SRS.

FIG. 9a is a diagram illustrating CS configuration of a specific SRS resource.

FIG. 9b is a diagram illustrating CSs reserved for ACK/NACK transmission through CS usage indication of an SRS resource.

FIG. 10 is a block diagram illustrating a procedure of transmitting an SRS resource by a UE to a BS according to an embodiment of the present disclosure.

FIG. 11 is a block diagram illustrating a procedure of receiving an SRS resource by a BS from a UE according to an embodiment of the present disclosure.

BEST MODE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

FIG. 2a is a diagram illustrating TXRU virtualization model option 1 (sub-array model) and FIG. 2b is a diagram illustrating TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

FIG. 3 is a block diagram for hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Features of NR Numerology

In NR, a method of supporting scalable numerology is being considered. That is, a subcarrier spacing of NR is represented as (2n×15) kHz, where n is an integer. From a nested viewpoint, a subset or a superset (at least 15, 30, 60, 120, 240, and 480 kHz) of the above subcarrier spacing is being considered as a main subcarrier spacing. Symbol or sub-symbol alignment between different numerologies has been configured to be supported by performing control to have the same cyclic prefix (CP) overhead ratio according to a subcarrier spacing. FIG. 5 is a diagram illustrating symbol/subsymbol alignment between different numerologies.

In addition, numerology is determined to have a structure for dynamically allocating time/frequency granularity according to services (eMBB, URLLC, and mMTC) and scenarios (high speed, etc.).

The following main agreements are made in new RAT (NR).

A maximum bandwidth allocated per NR carrier is 400 MHz.

Details of up to 100 MHz are specified in standard specification Rel 15.

Scalable numerology is adopted. That is, 15 kHz*(2n) (15 to 480 kHz) is used.

One numerology has one subcarrier spacing (SCS) and one CP. Each SCS and CP are configured by RRC.

A subframe has a fixed length of 1 ms (a transmission time interval (TTI) is a unit of a slot (14 symbols), a mini-slot (in the case of URLLC), or a multi-slot depending on the SCS or purpose (e.g., URLLC), and the TTI is also configured by RRC signaling (one TTI duration determines how transmission is made on a physical layer)).

That is, all numerologies are aligned every 1 ms.

The number of subcarriers in each resource block (RB) is fixed to 12.

The number of symbols in a slot is 7 or 14 (when an SCS is lower than 60 kHz) and 14 (when an SCS is higher than 60 kHz).

NR PUCCH Formats

Physical uplink control channel (PUCCH) formats may be classified according to duration/payload size.

A short PUCCH has format 0 (<=2 bits) or format 2 (>2 bits).

A long PUCCH has format 1 (<=2 bits), format 3 (>2, [>N] bits), or format 4 (2>2, [<=N] bits).

In regard to a PUCCH, a transmit diversity scheme is not supported in Rel-15.

Simultaneous transmission of a PUSCH and PUCCH by the UE is not supported in Rel-15.

TABLE 1

| Format | PUCCH length in OFDM symbols | Number of bits | [Usage] | Etc. |
|---|---|---|---|---|
| 0 | 1-2 | <=2 | HARQ, SR | Sequence selection |
| 1 | 4-14 | <=2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [<=N] | HARQ, CSI, [SR] | DFT-s-OFDM (Pre DFT OCC) |

Features of SRS Hopping in LTE System

SRS hopping is performed only in the case of periodic SRS triggering (i.e., triggering type 0).

Allocation of SRS resources is given by a predefined hopping pattern.

A hopping pattern may be UE-specifically configured through RRC signaling (however, overlapping is not allowed).

The SRS is hopped in the frequency domain by applying a hopping pattern to each subframe in which a cell/UE-specific SRS is transmitted.

An SRS starting location and hopping formula in the frequency domain are defined by Equation 1 below.

[Equation 1]

$$k_0^{(p)} = \bar{k}_0^{(p)} + \sum_{b=0}^{B_{SRS}} K_{TC} M_{sc,b}^{RS} n_b$$

-continued $$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) =$$

$$\begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases}$$

$$n_{SRS} = \begin{cases} 2N_{SP} n_f + 2(N_{SP}-1) \lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

where $n_{SRS}$ denotes a hopping interval in the time domain, $N_b$ denotes the number of branches allocated to a tree level b, and b may be determined by setting $B_{SRS}$ in dedicated RRC.

FIG. 6 is a diagram illustrating an LTE hopping pattern (ns=1→ns=4).

An example of configuring the LTE hopping pattern will now be described.

LTE hopping pattern parameters may be set through cell-specific RRC signaling. For example, $C_{SRS}$=1, $N_{RB}^{UL}$=100, $n_f$=1, and $n_s$=1 may be set.

Next, the LTE hopping pattern parameters may be set through UE-specific RRC signaling. For example, $B_{SRS}$=1, $b_{hop}$=0, $n_{RRC}$=22, and $T_{SRS}$=10 may be configured for UE A; $B_{SRS}$=2, $b_{hop}$=0, $n_{RRC}$=10, and $T_{SRS}$=5 may be configured for UE B; and $B_{SRS}$=3, $b_{hop}$=2, $n_{RRC}$=23, and $T_{SRS}$=2 may be configured for UE C.

Features of NR Antenna Switching

Features of NR antenna switching

In NR, inter-slot and intra-slot antenna switching is supported. For intra-slot antenna switching, a guard period may be configured. In the case of 1T2R (or 1Tx2Rx) and 2T4R (or 2Tx4Rx), the UE is configured with two SRS resources each corresponding to one symbol or two symbols. In the case of 1T4R (or 1Tx4Rx), the UE is configured with 4 SRS resources each corresponding to a single symbol and a single port. Each port of the configured resources is associated with a different UE antenna.

In NR, the number of ports within one SRS resource has been determined as up to 4. The respective ports are mapped to 4 cyclic shift (CS) values to maintain orthogonality between the ports. In contrast, in the case of 1T4R or 1T2R, the number of Tx beams capable of being simultaneously transmitted is one and this means that only one port may be mapped to one SRS resource. In the case of 2T4R, up to 2 ports may be mapped to one SRS resource. Accordingly, reserved CSs may be present during SRS transmission. As an example, when a transmission comb (TC) of a 4-RB SRS resource is 4 and 12 CSs can be used, the SRS resource may be subjected to code division multiplexing (CDM) using different CSs for UL sounding by a maximum of 3 UEs. FIG. 7a illustrates that all of 12 CSs for a 4-RB SRS resource are used by 3 UEs.

In contrast, if UEs for antenna switching are allocated to the SRS resource as illustrated in FIG. 7b, reserved CSs may be present. Accordingly, an opportunity of using this resource may occur. That is, an opportunity of allocating the SRS resource to 3 or more UEs instead of allocating the SRS resource to 3 UEs may occur or an opportunity of using the SRS resource for other usages (e.g., uplink control information (UCI) may occur.

Alternatively, reserved CSs may be present even when fewer UEs than UEs that may be maximally allocated to the SRS resource are allocated although corresponding UEs are not the UEs for antenna switching. For example, when only one or two UEs are allocated to the SRS resource although up to 3 UEs may be allocated to the SRS resource, an opportunity of using reserved resources may occur.

Accordingly, information that a network desires to receive or a UE desires to transmit may be transmitted or received at a faster timing using reserved resources in the SRS than a general transmission or reception timing.

Proposal 1

If a certain SRS resource is allocated as a sounding resource for UEs for performing Tx antenna switching or if the number k of provided CSs is smaller than the maximum number N of CSs available for the SRS resource, fields for indicating usages of reserved N-k CSs other than CSs used for sounding in the SRS resource are UE-specifically provided to the UE through higher layers L3 (radio resource control (RRC)), L2 (medium access control-control element (MAC-CE)), and/or L1 (downlink control information (DCI)). Unlike the case of indicating the usages through RRC, the usages may be dynamically designated through the DCI.

The fields for indicating the usages include a corresponding SRS resource index and a corresponding usage index. Usage indexes of the reserved CSs and usages according to the usage indexes are shown in Table 2. In this case, the fields may additionally include a CS index that is not used for the SRS. The contents of Table 2 may be referred to as information about usages of CSs that are not used for the SRS. The usage indexes of the reserved CSs may also be referred to as usage indication indexes. Since information about mapping between the CS usage indexes and the usages of Table 2 are previously transmitted through RRC, the BS and the UE have the same mapping information.

TABLE 2

| Usage indexes of reserved CSs | Usages |
| --- | --- |
| 0 | Scheduling Request (SR) |
| 1 | ACK/NACK |
| 2 | Beam failure recovery request |
| 3 | ACK only |
| 4 | NACK only |
| Reserved | Reserved |

If usage is designated as ACK and/or NACK according to Table 2, the BS may inform the UE of DL on which ACK/NACK should be transmitted through the DCI. After ACK/NACK is transmitted using the SRS resource, ACK/NACK may be transmitted once more on the same DL through a PUSCH or a PUCCH, so that ACK/NACK may be stably transmitted. Alternatively, upon receiving a plurality of DL signals, the UE may transmit ACK/NACK for one of the DL signals through the SRS resource and transmit ACK/NACK for the other DL signals through the PUSCH or the PUCCH. Thus, resources may be efficiently managed and ACK/NACK may be rapidly transmitted.

Proposal 1-1

If the number k of provided CSs is smaller than the maximum number N of CSs available for the SRS resource, the fields for indicating the usages of N-k CSs other than CSs used for sounding in the SRS resource are UE-specifically provided to the UE through the higher layers L3 (RRC), L2 (MAC-CE), and/or L1 (DCI).

The fields for indicating the usages include a corresponding SRS resource index and a corresponding CS index. The usage indexes are shown in Table 2.

For example, when 6 SRS resources are triggered in one slot as illustrated in FIG. 8, if SRS resource index 2 and reserved CS usage index 0 of the SRS resource are provided to the UE to indicate reserved CS usage, the UE may transmit an SR with reference to Table 2 above using a reserved CS other than CSs used for sounding of resource index 2 at an SRS transmission instance.

FIG. 8 illustrates SRS triggering and reserved CS usage indication for an SRS.

In FIG. 8, if SRS resource index 2, CS index 4, and usage index 0 are indicated and transmitted to the UE, the UE transmits the SR using CS index 4 on a resource of index 2 to the BS.

Proposal 1-2

The fields for indicating the usages of CSs other than CSs used for sounding are UE-specifically provided to the UE in units of an SRS resource group (or SRS resource set) including a plurality of SRS resources, in units of an SRS symbol in a slot, or in units of a slot, through the higher layers L3 (RRC), L2 (MAC-CE), and/or L1 (DCI).

The fields for indicating the usages may include a corresponding slot index, a corresponding SRS resource group index, and/or a corresponding SRS symbol index and the usage indexes are as shown in Table 2.

Proposal 1-3

For a periodic/semi-persistent SRS, the fields for indicating the usages of CSs that are not used for sounding with respect to slots in which the SRS is transmitted through RRC may be provided through the higher layer L3 (dedicated RRC). Accordingly, the UE may not use the CSs that are not used for sounding for the purpose of usages except for usages indicated through RRC. Since the fields for indicating the usages of the CSs received through RRC includes a resource index, a CS index, and a usage indication index, the UE need not separately receive related information through the DCI etc. Accordingly, the UE transmits the SRS resource using an indicated CS when it is necessary to transmit information according to indicated usage.

Proposal 2

When SRS resources are used for sounding for UEs for performing antenna switching such as 1Tx4Rx, 1Tx2Rx, and/or 2Tx4Rx, the SRS resources are predetermined to include reserved CSs and usages of the reserved CSs other than CSs used for sounding of the resources are configured through the higher layer L3 (cell-specific or UE-specific dedicated RRC). Similarly to Proposal 1-3, since the fields for indicating the usages of CSs are provided through RRC, it is not necessary to additionally receive related information through the DCI etc.

Proposal 3

A method using a CS may be configured through selection between CSs in an SRS sequence. Configuration for CS selection may be UE-specifically transmitted through the higher layers L3 (RRC), L2 (MAC-CE), and/or L1 (DCI).

If the number of reserved CSs other than CSs used for sounding in a corresponding SRS resource is n, then the number of the reserved CSs may be represented as $\lfloor \log_2(n) \rfloor$ bits. In this case, information about mapping between bit indexes and CSs (e.g. a function, pattern, or mapping rule between CSs and bits) is transmitted. This information may be UE-specifically transmitted through the higher layers L3 (RRC), L2 (MAC-CE), and/or L1 (DCI). For example, when a set of the reserved CSs is {1,3,4,6}, CS index 1 may correspond to bits 00, CS index 3 may correspond to bits 01, CS index 4 may correspond to bits 10, and CS index 6 may correspond to bits 11.

The information about mapping between bit indexes and CS indexes may be mapped in a predetermined order. For example, CS indexes starting from a small index up to a large index may be mapped in ascending order of bit indexes.

For example, it is assumed that the maximum number of CSs applicable to a certain SRS resource is 12 and 8 CSs are transmitted for sounding as illustrated in FIG. 9a. In this case, if the reserved CSs are as illustrated in FIG. 9b, 2-bit UCI may be transmitted. The BS determines CS usage of the SRS resource as ACK/NACK and designates CS index 0, CS index 3, CS index 6, and CS index 9 as UCI 00, UCI 01, UCI 10, and UCI 11, respectively. Therefore, ACK/NACK transmission for two DL resource allocation regions may be distinguished. For example, when a bit set to 1 is assumed to be or configured as ACK and a bit set to 0 is assumed to be or configured as NACK, if UE 1 transmits the SRS resource using CS index 9, the BS recognizes that UCI bits are 11 and all of two corresponding DL resources are ACK.

Proposal 4

A method using a CS may be indicated through sequence modulation (on/off keying) in an SRS sequence.

For example, if usages of reserved CSs except for CSs used for sounding of SRS resource 1 indicate index 3 in Table 2, the reserved CSs may be used for ACK. As an example, when CS indexes 1, 3, 5, and 7 are used for CSs among 8 CSs and the remaining CSs are used to indicate NACK, if an SRS resource to which any one of CS indexes 0, 2, 4, and 6 is applied is transmitted, the BS may recognize that NACK is received. Alternatively, if any one of CS indexes 0, 2, 4, and 6 is not received although CS indexes 0, 2, 4, and 6 are designated as being used as NACK, the BS may assume that NACK is received. When the usages of the reserved CSs except for CSs used for sounding indicate index 2 and CS index 0 is indicated to UE A, if UE A transmits SRS resource 1 using CS index 0, the BS recognizes a DL resource of UE A as ACK. If the BS fails to receive SRS resource 1 using CS index 0 although CS index 0 is indicated to the UE, the BS may recognize that a corresponding resource as NACK.

FIG. 10 is a block diagram illustrating a procedure of transmitting an SRS resource by a UE to a BS according to an embodiment of the present disclosure.

When all of CSs of an SRS resource are not used for an SRS, the UE receives information about usages of the CSs not used for the SRS through RRC from the BS (S1001). An example of the information about the usages of the CSs is shown in Table 2.

Next, the UE receives information about an SRS resource index, a CS index not used for the SRS, and a usage indication index from the BS (S1002). Here, the SRS resource index represents an SRS resource in which all CSs are not used for the SRS. The usage indication index may indicate one of information about the usages of the CSs received in S1001.

The UE transmits the SRS resource using the usage indication index and the CS index received in step S1002 (S1003).

Alternatively, as described in Proposal 1-3 and Proposal 2, steps S1001 and S1002 may be integrated into one step. That is, the information about the usages of the CSs not used for the SRS and the information about the SRS resource index, the CS index not used for the SRS, and the usage indication index may be received altogether through RRC.

Hereinafter, an operation of the UE will be described with reference to FIG. 1.

When all CSs of an SRS resource are not used for an SRS, the UE 20 for transmitting the SRS resource includes the processor 21, and the RF unit 23 coupled to the processor 21 to transmit or receive a radio signal. The processor 21 is configured to receive, through the RF unit 23, information about usages of the CSs not used for the SRS, receive information about an SRS resource index, a CS index not used for the SRS, and a usage indication index through the RF unit 23, and transmit the SRS resource using the CS index through the RF unit 23. Usage of the SRS resource is determined based on the information about the usages of the CSs and the usage indication index.

FIG. 11 is a block diagram illustrating a procedure of receiving an SRS resource by a BS from a UE according to an embodiment of the present disclosure.

When all of CSs of an SRS resource are not used for an SRS, the BS transmits information about usages of the CSs not used for the SRS through RRC to the UE (S1101). An example of the information about the usages of the CSs is shown in Table 2.

Next, the BS transmits information about an SRS resource index, a CS index not used for the SRS, and a usage indication index to the UE (S1102). Here, the SRS resource index represents an SRS resource in which all CSs are not used for the SRS. The usage indication index may indicate one of information about the usages of the CSs transmitted in S1101.

The BS receives the SRS resource according to the usage indication index and the CS index transmitted in step S1102 (S1103).

Alternatively, as described in Proposal 1-3 and Proposal 2, steps S1101 and S1102 may be integrated into one step. That is, the information about the usages of the CSs not used for the SRS and the information about the SRS resource index, the CS index not used for the SRS, and the usage indication index may be transmitted altogether through RRC.

Hereinafter, an operation of the BS will be described with reference to FIG. 1.

When all CSs of an SRS resource are not used for an SRS, the BS 20 for receiving the SRS resource, includes the processor 11, and the RF unit 13 coupled to the processor 11 to transmit or receive a radio signal. The processor 21 is configured to transmit, through the RF unit 23, information about usages of the CSs not used for the SRS, transmit information about an SRS resource index, a CS index not used for the SRS, and a usage indication index through the RF unit 13, and receive the SRS resource using the CS index through the RF unit 13. Usage of the SRS resource is determined based on the information about the usages of the CSs and the usage indication index.

During NR SRS transmission, when the number of ports in an SRS resource is smaller than the maximum number of SRS transmission ports according to capabilities of UEs for Tx antenna transmission (e.g. UEs for Tx antenna switching), there may be unused CSs among CSs used to distinguish orthogonality between ports in the SRS resource. The present technology relates to a method for using these CSs. The present disclosure relates to a method of transmitting UCI that has small payload or should be ungently transmitted (e.g. SR, ACK/NACK, the beam failure recovery request fields on PUCCH format 0 and/or PUCCH format 1) at a reception timing desired by a network using such CSs.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The methods for transmitting and receiving an SRS and communication devices therefor may be industrially applied to various wireless communication systems including the 3GPP LTE/LTE-A system, the NR (5G) communication system, etc.

The invention claimed is:

1. A method of transmitting a sounding reference signal (SRS) resource by a user equipment (UE), the method comprising:
   receiving information related to triggering of a SRS;
   transmitting the SRS resource based on the information related to the triggering of the SRS,
   wherein the information related to the triggering of the SRS includes information about cyclic shifts (CSs) not used for the SRS,
   wherein the information about the CSs not used for the SRS includes a CS index related to CSs not used for the SRS, a SRS resource index related to the CS index and a usage indication index indicating a type of usage for CSs identified by the CS index.

2. The method of claim 1, wherein the UE is a UE to which antenna switching is applied.

3. The method of claim 1, wherein the usage type includes a scheduling request (SR), acknowledgement (ACK), negative ACK (NACK), and a beam failure recovery request, and the usage indication index indicates one of the usage types.

4. The method of claim 1, wherein the CS index related to CSs not used for the SRS includes two or more indexes and the usage indication index is differently configured with respect to the CS index.

5. A method of receiving a sounding reference signal (SRS) resource from a user equipment (UE) by a base station (BS), the method comprising:
   transmitting information related to triggering of a SRS; and
   receiving the SRS resource based on the information related to the triggering of the SRS,
   wherein the information related to the triggering of the SRS includes information about the usages of cyclic shifts (CSs) not used for the SRS, and
   wherein the information about CSs not used for the SRS includes a CS index related to CSs not used for the SRS, a SRS resource index related to the CS index and a usage indication index indicating a type of usage for CSs identified by the CS index.

6. The method of claim 5, wherein the UE is a UE to which antenna switching is applied.

7. The method of claim 5, wherein another UE sharing the SRS resource is a UE to which antenna switching is applied.

8. The method of claim 5, wherein the usage type includes a scheduling request (SR), acknowledgement (ACK), negative ACK (NACK), and a beam failure recovery request, and the usage indication index indicates one of the usage types.

9. The method of claim 5, wherein the CS index related to CSs not used for the SRS includes two or more indexes and the usage indication index is differently configured with respect to the CS index.

10. A user equipment (UE) configured for transmitting a sounding reference signal (SRS) resource, the UE comprising:
    a processor; and
    a transmitter and a receiver operatively coupled to the processor to transmit and receive a radio signal,
    wherein the processor is configured to:
    receive, through the receiver, information related to triggering of a SRS, and
    transmit the SRS resource based on the information related to triggering of the SRS through the transmitter, and
    wherein the information related to the triggering of the SRS includes information about the cyclic shifts (CSs) not used for the SRS, and
    wherein the information about the CSs not used for the SRS includes a CS index related to the CSs not used for the SRS, a SRS resource index related to the CS index and a usage indication index indicating a type of usage for CSs identified by the CS index.

11. The UE of claim 10, wherein the UE is a UE to which antenna switching is applied.

12. The UE of claim 10, wherein the usage type includes a scheduling request (SR), acknowledgement (ACK), negative ACK (NACK), and a beam failure recovery request, and the usage indication index indicates one of the usage types.

13. A base station (BS) configured for receiving a sounding reference signal (SRS) resource from a user equipment (UE), the BS comprising:
    a processor; and
    a transmitter and a receiver operatively coupled to the processor to transmit and receive a radio signal,
    wherein the processor is configured to:
    transmit, through the transmitter, information related to the triggering of a SRS, and receive the SRS resource through the receiver based on the information related to the triggering of the SRS, wherein the information related to the triggering of the SRS includes information about the usages of cyclic shifts (CSs) not used for the SRS, and wherein the information about the CSs not used for the SRS includes a CS index related to the CSs not used for the SRS, a SRS resource index related to the CS index and a usage indication index indicating a type of usage for CSs identified by the CS index.

14. The BS of claim 13, wherein the UE is a UE to which antenna switching is applied.

15. The BS of claim 13, wherein another UE sharing the SRS resource is a UE to which antenna switching is applied.

16. The BS of claim 13, wherein the usage type includes a scheduling request (SR), acknowledgement (ACK), negative ACK (NACK), and a beam failure recovery request, and the usage indication index indicates one of the usage types.

* * * * *